United States Patent
Higaki et al.

(10) Patent No.: US 11,393,074 B2
(45) Date of Patent: Jul. 19, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Yoshinari Higaki, Atsugi (JP); Daiki Nakagawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 16/836,103

(22) Filed: Mar. 31, 2020

(65) Prior Publication Data
US 2020/0342573 A1 Oct. 29, 2020

(30) Foreign Application Priority Data

Apr. 25, 2019 (JP) .............................. JP2019-084438

(51) Int. Cl.
*G06T 5/00* (2006.01)
*G06T 7/33* (2017.01)

(52) U.S. Cl.
CPC .............. *G06T 5/002* (2013.01); *G06T 7/337* (2017.01)

(58) Field of Classification Search
CPC ......... G06T 3/4038; G06T 5/002; G06T 5/20; G06T 5/10; G06T 5/50; G06T 5/00; G06T 5/001; G06T 7/337; G06T 7/90; G06T 7/00; G06T 7/223; G06T 11/80; G06T 2207/20021; G06T 2207/20182; G06T 2207/20012; G06T 2207/20024; G06T 2207/10004; G06T 2207/10024; G06T 2207/20076; G06T 2207/20192;
(Continued)

(56) References Cited

U.S. PATENT DOCUMENTS

2014/0355892 A1* 12/2014 Moon .................. G06K 9/6215
382/220
2015/0093041 A1* 4/2015 Kang ..................... G06T 5/002
382/275
(Continued)

FOREIGN PATENT DOCUMENTS

JP 2013-26669 A 2/2013

OTHER PUBLICATIONS

Lebrun, et al., A Non-local Bayesian Image Denoising Algorithm, SIAM Journal on Imaging Science, vol. 6, No. 3, Sep. 2013, pp. 1665-1688.

*Primary Examiner* — Jose L Couso
(74) *Attorney, Agent, or Firm* — Canon U.S.A., Inc. IP Division

(57) ABSTRACT

There is provided an image processing apparatus that performs noise reduction processing by using a patch obtained by dividing an image into small areas. The image processing apparatus includes a setting unit configured to set, for the image, a patch of interest, a search unit configured to search the image for a similar patch based on the patch of interest, a generation unit configured to generate one or more synthesis patches different from a patch included in the image, based on at least one of the patch of interest and the similar patch, and a noise reduction unit configured to reduce noise in the patch of interest by using a patch group including the patch of interest, the similar patch, and the one or more synthesis patches.

19 Claims, 8 Drawing Sheets

(58) Field of Classification Search
CPC ............ G06T 2207/10016; H04N 5/21; H04N 5/357; H04N 5/213; H04N 5/911; H04N 5/2351; H04N 1/409; H04N 1/58; H04N 1/6027; H04N 7/102; H04N 9/04517; H04N 9/04557; H04N 19/33; H04N 19/176; H04N 19/117; G06K 9/40; G06K 9/4642; G06K 9/6215
See application file for complete search history.

(56) References Cited

U.S. PATENT DOCUMENTS

| | | | |
|---|---|---|---|
| 2015/0187053 A1* | 7/2015 | Chen | G06T 5/20 |
| | | | 382/264 |
| 2016/0148385 A1* | 5/2016 | Koshiba | G06T 5/002 |
| | | | 382/165 |
| 2017/0188038 A1* | 6/2017 | Chen | G06T 5/50 |
| 2017/0278224 A1* | 9/2017 | Onzon | G06T 5/002 |
| 2019/0188829 A1* | 6/2019 | Wei | H04N 19/55 |
| 2020/0267339 A1* | 8/2020 | Douady-Pleven | H04N 19/503 |

* cited by examiner

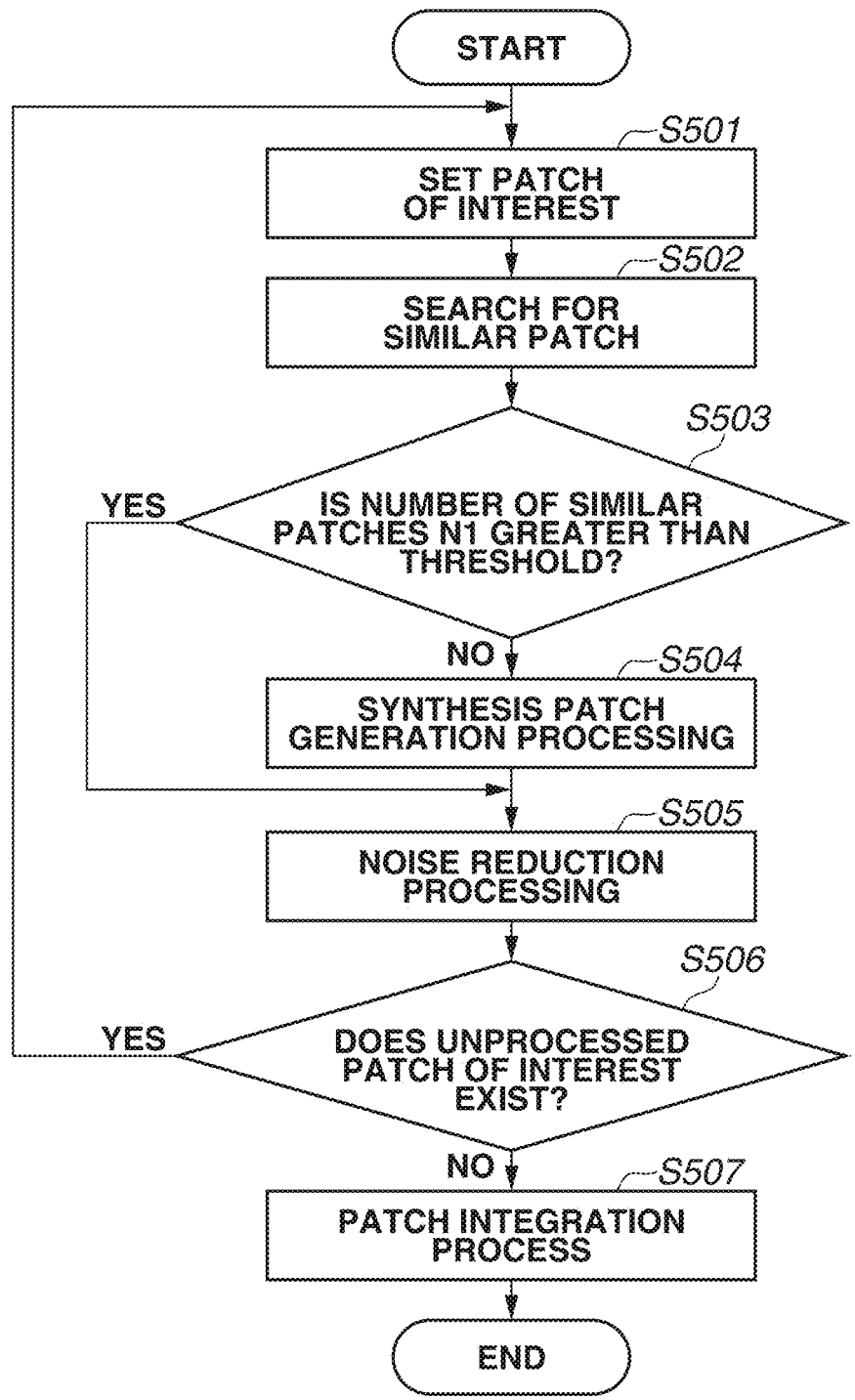

FIG.7

| CONDITION | CONDITION 1 | CONDITION 2 | CONDITION 3 | CONDITION 4 |
|---|---|---|---|---|
| N | 216 | 432 | 432 | 432 |
| NUMBER OF SYNTHESIS PATCHES | 0 | 216 | 216 | 216 |
| v' | — | 0 | v | 2v |
| PSNR[dB] | 24.10 | 21.06 | 26.27 | 26.72 |

IMAGE PROCESSING APPARATUS, IMAGE PROCESSING METHOD, AND STORAGE MEDIUM

BACKGROUND

Field

The present disclosure relates to an image processing technique for reducing noise in an image.

Description of the Related Art

Ability to acquire high quality images even at a dark place or at night is demanded for recent image capturing apparatuses such as digital cameras. High-sensitivity image capturing is necessary in such environment. In this case, image quality becomes poor due to noise because of insufficient SN ratio. Thus, importance of a noise reduction technique has been recognized.

Regarding this issue, in recent years, it has been widely known that patch-based noise reduction methods (hereinafter, referred to as "patch-based method") are effective, as discussed in, for example, Japanese Patent Application Laid-Open No. 2013-26669 and A. Buades, M. Lebrun, and J. M. Morel. A Non-local Bayesian image denoising algorithm, SIAM Journal on Imaging Science, 2013. The patch-based method is a method that uses a phenomenon that, if an image is decomposed into small areas (hereinafter, referred to as "patches"), the image includes a large number of patches similar to each other, to provide higher noise reduction performance compared with conventional noise reduction methods.

SUMMARY

To obtain satisfactory result in the patch-based method, it is required that a sufficient number of similar patches are present in patches in the image. However, real images have unevenness in texture type and frequency, and thus it cannot be ensured that a sufficient number of similar patches are always present among patches. As a result, in the noise reduction methods using the conventional patch-based method, the noise reduction effect varies from area to area in an image, and thus overall image quality may become poor.

The present disclosure features a technique capable of stably providing high quality images with reduced noise irrespective of image content.

According to an aspect of the present disclosure, an image processing apparatus that performs noise reduction processing by using a patch obtained by dividing an image into small areas, includes a setting unit configured to set, for the image, a patch of interest, a search unit configured to search the image for a similar patch based on the patch of interest, a generation unit configured to generate one or more synthesis patches different from a patch included in the image, based on at least one of the patch of interest and the similar patch, and a noise reduction unit configured to reduce noise in the patch of interest by using a patch group including the patch of interest, the similar patch, and the one or more synthesis patches.

Further features of the present disclosure will become apparent from the following desciiption of exemplary embodiments with reference to the attached drawings.

BRIEF DESCRIPTION OF THE DRAWINGS

FIG. 5 is a flowchart illustrating a flow of image processing.

FIG. 7 is a table illustrating an example of noise reduction performance.

DESCRIPTION OF THE EMBODIMENTS

Figure 1:
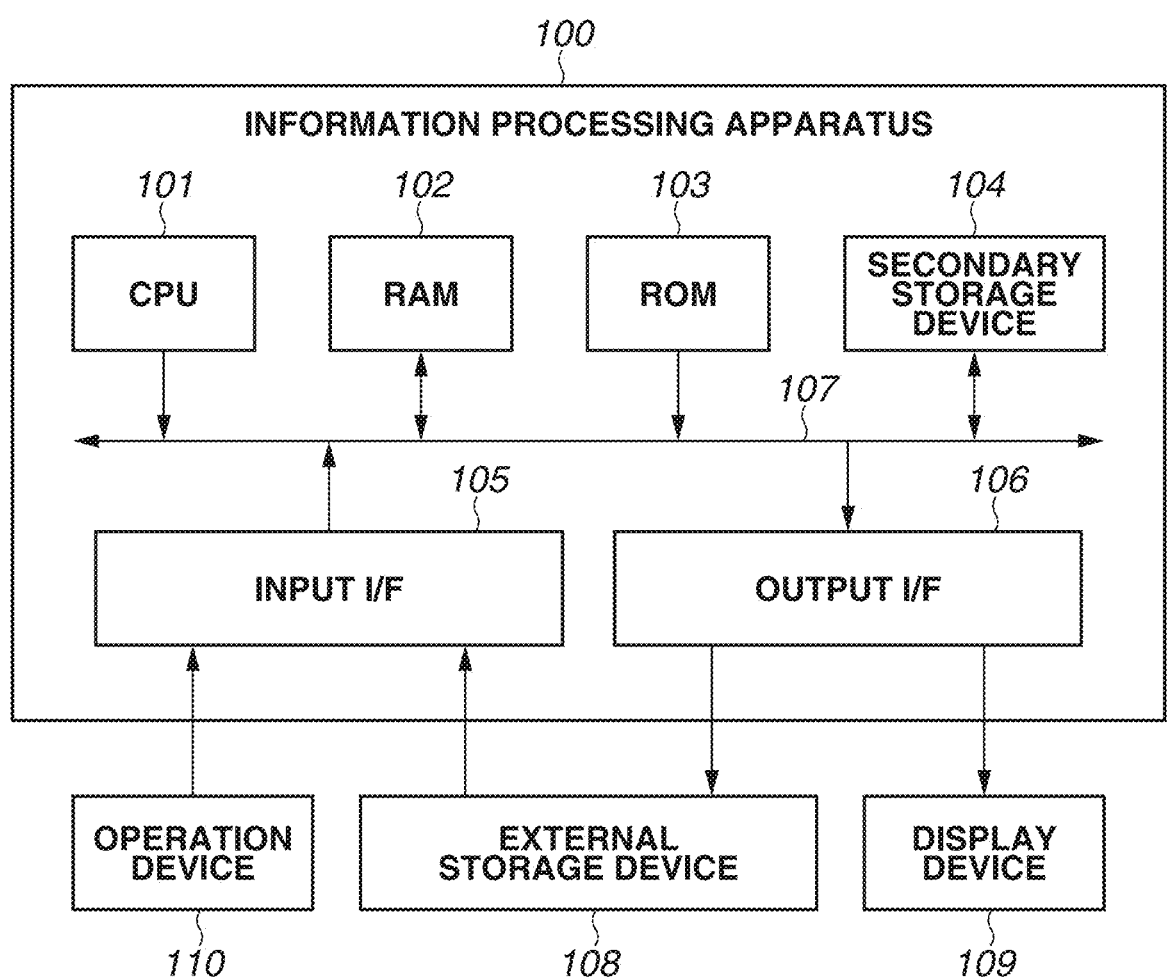
FIG. 1 is a block diagram schematically illustrating a configuration of an information processing apparatus according to a first exemplary embodiment.

Exemplary embodiments of the present disclosure will be described below in detail with reference to accompanying drawings. It is noted that the exemplary embodiments described below are not intended to limit the present disclosure. Further, in the following description, the same components are denoted by the same reference numerals.

FIG. 1 is a block diagram schematically illustrating a configuration of an information processing apparatus that is an example of an image processing apparatus according to a first exemplary embodiment of the present disclosure. An information processing apparatus 100 according to the present exemplary embodiment includes, as components thereof, a central processing unit (CPU) 101, a random access memory (RAM) 102, a read only memory (ROM) 103, a secondary storage device 104, an input interface (IF) 105, and an output interface (IF) 106. The components in the information processing apparatus 100 are mutually connected through a system bus 107. Furthermore, the information processing apparatus 100 is connected with an external storage device 108 and an operation unit 110 via the input IF 105. Furthermore, the information processing apparatus 100 is connected with the external storage device 108 and a display device 109 via the output IF 106.

The CPU 101 performs overall control of components through the system bus 107 by using, as a work memory, the RAM 102, and executing a program stored in the ROM 103. With this configuration, various kinds of processing described below are performed. The secondary storage device 104 is a storage device configured to store various kinds of data used in the information processing apparatus 100, and in the present exemplary embodiment, a hard disk drive (HDD) is used as the secondary storage device 104. Other than a HDD, various storage devices, such as an optical disk drive and a flash memory, can be used as the secondary storage device 104. The CPU 101 writes data into the secondary storage device 104 and reads out data stored in the secondary storage device 104, via the system bus 107.

The input IF 105 is a serial bus interface based on, for example, Universal Serial Bus (USB) or IEEE 1394. Data, commands, and the like are input from an external device (not illustrated) to the information processing apparatus 100, via the input IF 105. In the present exemplary embodiment, the information processing apparatus 100 acquires data from the external storage device 108 via the input IF 105. The external storage device 108 is a device including, as a storage medium, a hard disk, a memory card such as a CompactFlash (CF®) card or a Secure Digital (SD) card, or a USB memory. In the present exemplary embodiment, the information processing apparatus 100 receives, via the input IF 105, an instruction from a user input via the operation unit 110. The operation unit 110 is an input device such as a mouse or a keyboard, and receives an instruction input from a user.

Like the input IF 105, the output IF 106 is a serial bus interface based on, for example, USB or IEEE 1394. The output IF 106 may be a video output terminal such as Digital Visual Interface (DVI) or High-Definition Multimedia Interface (HGMI®). The information processing apparatus 100 outputs data and the like to an external device (not illustrated), via the output IF 106. In the present exemplary embodiment, the information processing apparatus 100 outputs, via the output IF 106, to the display device 109 (, various types of image display devices such as a liquid crystal display), data (e.g., image data) processed by the CPU 101. Although the information processing apparatus 100 may include other components in addition to the above-described components, description thereof is omitted in the present exemplary embodiment.

Hereinafter, image processing performed by the information processing apparatus 100 according to a first exemplary embodiment will be described. An image input to the informationprocessing apparatus 100 according to the present exemplary embodiment is an image acquired by using an image capturing apparatus such as a digital camera. The information processing apparatus 100 according to the present exemplary embodiment is described with reference to an example in which an image is decomposed into small areas (patches), and a plurality of resembling patches included in that image is used to perform noise reduction processing based on a patch-based method. In the following description, resembling patches are referred to as similar patches.

Figure 2:
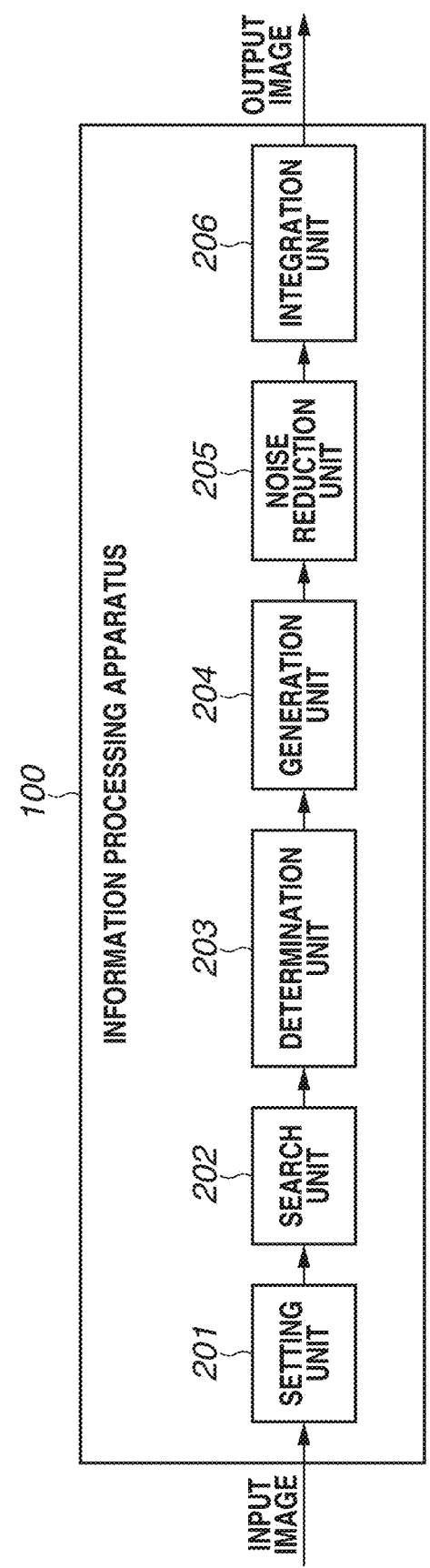
FIG. 2 is a functional block diagram illustrating a functional configuration of the information processing apparatus.
Figure 3:
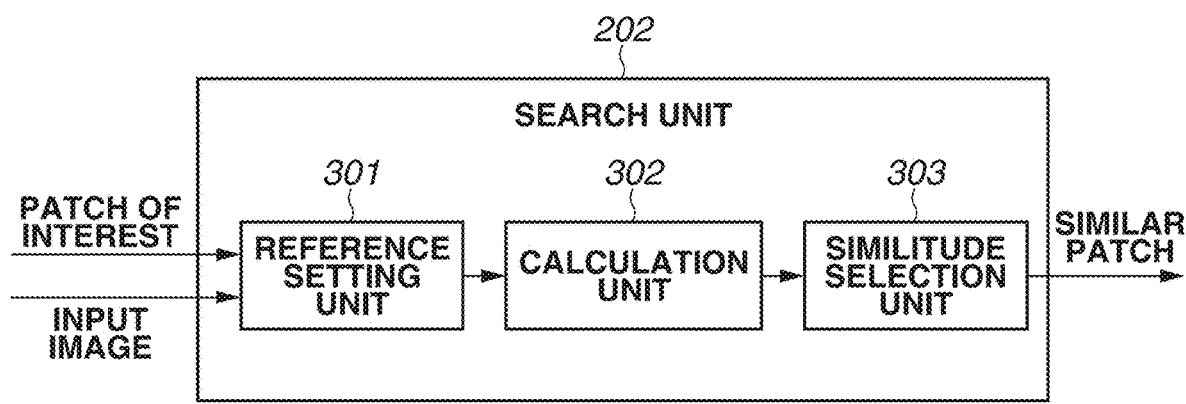
FIG. 3 is a functional block diagram illustrating a functional configuration of a search unit.
Figure 4:
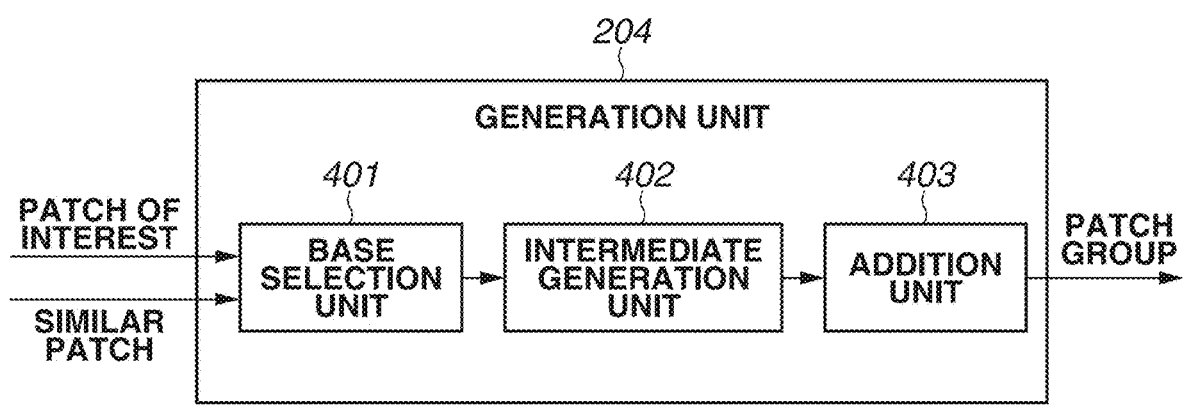
FIG. 4 is a functional block diagram illustrating a functional configuration of a generation unit according to the first exemplary embodiment.

FIG. 2 is a functional block diagram illustrating a functional configuration of the information processing apparatus 100 according to the present exemplary embodiment. As illustrated in FIG. 2, the information processing apparatus 100 according to the present exemplary embodiment includes, as functional units, a setting unit 201, a search unit 202, a determination unit 203, a generation unit 204, a noise reduction unit 205, and an integration unit 206. FIG. 3 is a functional block diagram illustrating a functional configuration of the search unit 202. As illustrated in FIG. 3, the search unit 202 includes, as functional units, a reference setting unit 301, a calculation unit 302, and a similitude selection unit 303. FIG. 4 is a functional block diagram illustrating a functional configuration of the generation unit 204. As illustrated in FIG. 4, the generation unit 204 includes, as functional units, a base selection unit 401, an intermediate generation unit 402, and an addition unit 403. The information processing apparatus 100 may be configured to include a dedicated processing circuit corresponding to each of the above-described functional units. FIG. 5 a flowchart illustrating a flow of image processing for reducing noise in an image (noise reduction processing), in the information processing apparatus 100 according to the present exemplary embodiment. The processing of flowchart illustrated in FIG. 5 is performed by the CPU 101 reading out, to the RAM 102, program codes stored in a storage area such as the ROM 103 and executing the program.

Hereinafter, the noise reduction processing performed by the information processing apparatus 100 according to the present exemplary embodiment will be described with reference to the functional block diagrams of FIGS. 2 to 4 and the flowchart of FIG. 5.

First, in step S501, the setting unit 201 extracts a patch of interest from an input image that is a processing target. The setting unit 201 sequentially sets a patch of interest from the input image so that all pixels to be subjected to noise reduction processing are included. For example, the setting unit 201 sequentially set, as a pixel of interest, each of all pixels included in the input image in the order of so-called raster scanning, and for each of the positions of the pixels of interest sequentially set, sequentially set, as a patch of interest, a patch having a size corresponding to a predetermined number of pixels and a predetermined shape. For example, a patch of interest may be a patch having a size corresponding to a predetermined number of pixels and a predetermined shape around the position of a pixel of interest, and a patch having a size corresponding to a predetermined number of pixels and a predetermined shape, with an upper- and left-most part corresponding to the position of a pixel of interest. However, if each of all the pixels in the input image is sequentially set as a pixel of interest and patches of interest are set for each of all the pixels, a large amount of processing and processing time are required. Thus, the setting unit 201 may skip the setting of a pixel of interest at, for example, regular pixel intervals to perform thinning of patches of interest as appropriate, reducing processing amount and processing time.

Next, in step S502, the search unit 202 extracts, as a similar patch, a patch similar to the patch of interest from the input image.

The reference setting unit 301 of the search unit 202 illustrated in FIG. 3 first sets a plurality of reference patches for the input image. The reference patches are patches included in a certain coordinate range defined based on the patch of interest and have the same size and shape as the patch of interest. Furthermore, reference patches adjacent to each other may partially overlap each other. In the present exemplary embodiment, the certain coordinate range defined based on the patch of interest is, for example, a rectangular region represented by a position then the patch of interest is shifted horizontally by a distance corresponding to W pixels and a position when the patch of interest is shifted vertically by a distance corresponding to W pixels. The reference setting unit 301 sets, as a reference pixel, each of pixels which are included in the certain coordinate range defined based on the patch of interest and which are not the pixel of interest, and for each of the reference pixels, sets, as a reference patch, a patch having the same size and shape as the patch of interest.

Next, the calculation unit 302 of the search unit 202 calculates similarity between the patch of interest and each of the reference patches included in the certain coordinate range defined based on the patch of interest. For example, the calculation unit 302 calculates a commonly known distance index, such as Sum of Squared Difference (SSD) or Sum of Absolute Difference (SAD), between pixels at the corresponding positions in the patch of interest and a reference patch, and acquires the distance index as a similarity.

Next, based on the similarity, the similitude selection unit 303 of the search unit 202 selects N1 reference patches from the plurality of reference patches in the above-described certain coordinate range, and acquires the selected reference patches as similar patches. For example, the similitude selection unit 303 selects, as a similar patch, a reference patch that gives a distance index, which is similarity, less than or equal to a threshold set in advance. The threshold value for the similarity (distance index) may be a constant value or may be determined as an adaptive value depending on the patch of interest. Alternatively, if the number of reference patches N1 which give similarity less than or equal to the threshold, is greater than a predetermined number of patches N, which is set in advance, the similitude selection unit 303 may sort those reference patches based on the distance index, which is similarity, and reselect, as similar patches, the upper N reference patches.

In this case, the number of similar patches N1, which are selected based on similarity from the plurality of reference patches in the above-described certain coordinate range, typically varies depending on characteristics of texture in a patch of interest and an input image. For example, if, due to characteristics of texture in a patch of interest and an input image, patches similar to the patch of interest are found infrequently in the input image, the number of patches selected as similar patches, N1 is small. For example, if a patch of interest has a more complex and sharp texture, it is more difficult to find a patch similar to the patch of interest, and as a result, the number of similar patches N1 tends to be smaller. However, in the patch-based noise reduction processing, insufficient number of similar patches results in regional unevenness in noise reduction effect in the image, and as a result, the overall image quality becomes poor.

Therefore, the information processing apparatus 100 generates, based on at least one of the patch of interest and the similar patch, a synthesis patch that is different from the patches included in the input image, and by using the synthesis patch and the similar patch, performs noise reduction processing on the patch of interest ithout significantly deteriorating image quality. For example, the information processing apparatus 100 uses the patch of interest and the N1 similar patches to newly generate (N–N1) synthesis patches, and generates a set of (N+1) patches (hereinafter, referred to as "patch group") acquired by connecting the patch of interest, the similar patches, and the synthesis patches. The object of this processing is to solve an issue that if the noise reduction processing is performed by using, as a patch group, only the patch of interest and a small number of similar patches, noise reduction performance becomes low. In other words, this processing is performed in order to suppress performance of noise reduction processing from depending on the number of similar patches. As described above, the information processing apparatus 100 generates a synthesis patch based on a patch of interest and similar patches, and uses the synthesis patch to increase the number of patches in a pseudo manner, preventing the performance of the noise reduction processing from varying for each patch of interest. As a result, the information processing apparatus 100 realizes excellent noise reduction processing.

Thus, in next step S503, in the information processing apparatus 100 according to the present exemplary embodiment, the determination unit 203 determines whether to perform the generation processing of synthesis patch. For example, if the number of the selected similar patches N1 is smaller than the predetermined number of patches that is set in advance (number of patches N), the determination unit 203 determines to perform the generation processing of synthesis patch. On the other hand, if the number of the selected similar patches N1 is greater than or equal to the predetermined patch number N, the determination unit 203 determines not to perform the generation processing of synthesis patch. Then, in step S503, if it is determined to perform generation processing of synthesis patch (NO in step S503), the processing proceeds to step S504. On the other hand, in step S503, if it is determined not to perform generation processing of synthesis patch (YES in step S503), the processing proceeds to step S505.

In step S504, the generation unit 204 uses the patch of interest and the N1 similar patches to newly generate N–N1 synthesis patches, and generates a patch group including a set of N+1 patches acquired by connecting the patch of interest, the similar patches, and the synthesis patches.

In the processing to be performed in step S504, first, the base selection unit 401 of the generation unit 204 illustrated in FIG. 4 selects, as base patches, N2 patches from the patch of interest and the N1 similar patches. The base patch may be selected at random with a uniform probability, or may be selected at random according to a probability weight determined based on characteristics of a similar patch. Alternatively, the base patch may be selected according to a predetermined rule using the distance index that is the similarity described above. The predetermined rule may be prepared, for example, as a look-up table. in this case, the look-up table is defined, for example, by associating combination of the patch of interest and the similar patch with the distance index so that the patch of interest and all the similar patches are evenly selected. Alternatively, the number of base patches N2 may be a value set in advance or may be determined adaptively based on the characteristics of similar patches.

Next, the intermediate generation unit 402 calculates a weighted average of the N2 base patches to genera one intermediate patch. A same value may be used as the weight for all the base patches, or a different value may be provided as the weight for each of the base patches based on, for example, the distance index, which is the similarity.

Next, the addition unit 403 adds random noise (hereinafter, referred to as "synthesis noise") to each of the pixels in the intermediate patch to generate a synthesis patch. The synthesis noise is determined independently for each pixel based on probability distributions having the same variance. It is desirable that the synthesis patch has a property common to the similar patches but is different from any patches in the patch group. in the intermediate patch, noise is reduced compared to similar patches due to the effect of averaging. More specifically, if the intermediate patch is generated by an arithmetic average of N2 base patches, according to the law of large numbers, noise variance included in the intermediate patch is reduced to 1/N2. However, since it is desirable that the synthesis patch contains noise that is similar to the similar patch, it is effective to add the above-described synthesis noise to the intermediate patch. In addition, the inventors verified that higher noise reduction performance can be achieved by making a variance value of the synthesis noise larger than the variance value of the noise actually included in the input image. The reason for this is probably that in the synthesis patch, the difference between similar patches needs to be reproduced in a pseudo manner in addition to the noise included in the input image, and therefore, the variance value of the synthesis noise that is larger than the noise included in the input image is effective. On the other hand, if the synthesis noise is not added, the noise reduction performance is reduced. The result of verifying the above effects will be described below with reference to FIG. 7.

In addition, the addition unit 403 may determine a variance value of the noise included in the input image or a variance value of synthesis noise by referring to a look-up table defined by associating, for example, International Organization for Standardization (ISO) sensitivity, that is a setting value for a camera when capturing an image, with a variance value of the noise. Alternatively, the addition unit 403 may analyze the input image by using a known method to estimate a variance value of the noise, and may determine the variance value of synthesis noise based on this estimation. The above-described processing is expressed by the following formula (1).

$$xi = \sum_{j \in Si} wjxj + ni \quad (1)$$

In formula (1), xi represents the i-th synthesis patch in the patch group, xj represents the j-th similar patch, wj represents a weight coefficient for the similar patch xj, Si represents a set of indices for identifying the base patches, and ni represents the synthesis noise. In addition, the patch of interest is x0. Each of xi, xj, and ni is a column vector, which is an array of pixels in the patch. i is a natural number not less than N1+1 and not more than N, and j is an integer not less than 0 and not more than N1.

The generation unit 204 repeats the above-described processing N−N1 times by using the configuration illustrated in FIG. 4, and as a result, N−N1 synthesis patches are generated.

Next, in step S505 of FIG. 5, the noise reduction unit 205 performs the noise reduction processing on the input patch group. Any of patch-based methods can be used for the noise reduction processing. For example, the noise reduction unit 205 first generates a matrix P representing a patch group, which is a set of xi, as expressed by formula (2). Next, as represented by formula (3), the noise reduction unit 205 repeats, for N+1 columns, acquiring an average patch by calculating an average of the matrix P in the row (horizontal) direction, to generate a matrix Pm. Furthermore, the noise reduction unit 205 calculates a covariance matrix C, as represented by formula (4). In formula (4), T represents transpose of a matrix. Then, the noise reduction unit 205 uses the covariance matrix C to calculate, according to formula (5), a set of patches (matrix Pd) with noise having been reduced. As described above, the noise reduction unit 205 estimates, based on a patch of interest and similar patches, a probability model represented by a covariance matrix representing correlation of pixels in the patch of interest, and, based on the estimated probability model, performs noise reduction processing for all the pixels in the patch of interest. The noise reduction unit 205 performs the above-described calculation processing to generate a noise-reduced patch group that is the input patch group with noise having been reduced in each patch.

$$P = [x0, x1, \cdots, xN] \quad (2)$$
$$Pm = [\overline{P} \cdots \overline{P}]$$

$$\overline{P} = \frac{1}{N+1} \sum_{k=0}^{N} xk \quad (3)$$

$$C = \frac{1}{N}(P - Pm)(P - Pm)^T \quad (4)$$

$$Pd = P - vC^{-1}(P - Pm) \quad (5)$$

In formula 4, T represents transpose of a matrix. In addition, v in formula (5) represents a variance value of the noise included in the input image. Each of the columns of Pd acquired by using formula (5) is a noise-reduced patch corresponding to the patch of each of the columns of P.

Figure 6A:
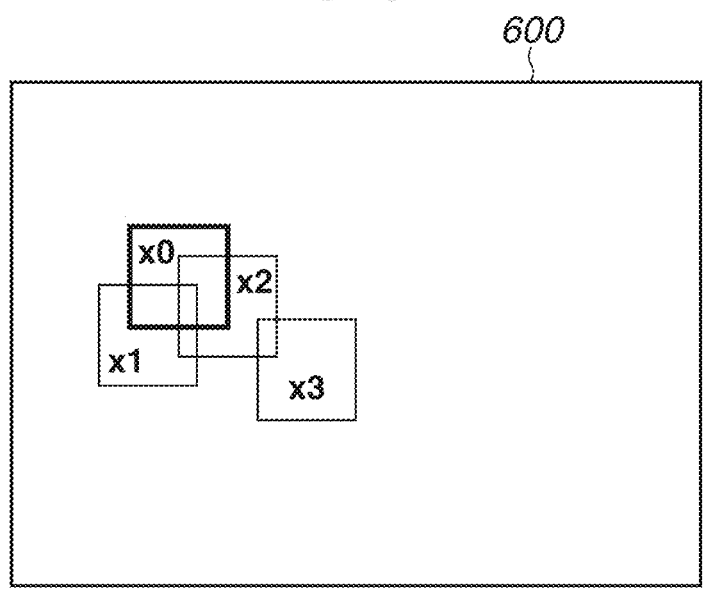
FIG. 6A is a diagram illustrating an example of patch in an image.
Figure 6B:
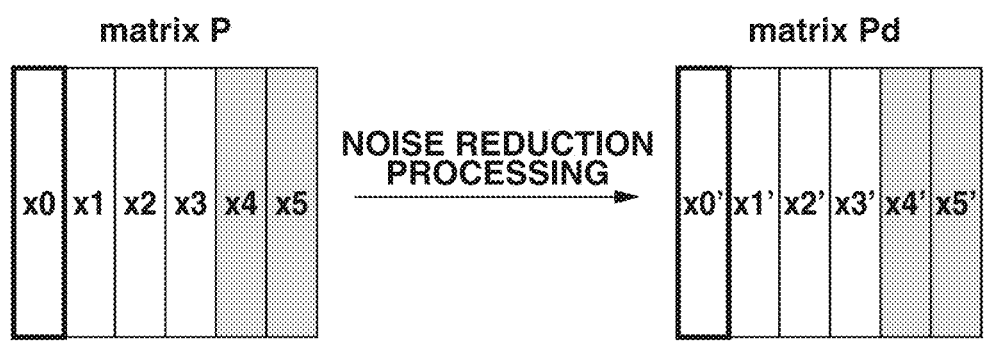
FIG. 6B is a diagram schematically illustrating an example of image processing.

FIG. 6A and FIG. 6B are diagrams schematically illustrating an example of the above-described processing when N=5 and N1=3. As illustrated in FIG. 6A, the noise reduction unit 205 extracts three similar patches x1 to x3 for a patch of interest x0 that is an arbitrarily selected patch from an input image 600. Then, the noise reduction unit 205 generates two synthesis patches, x4 and x5, based on the patch of interest x0 and the similar patches x1 to x3, as illustrated in FIG. 6B, and transforms each of the patches x0 to x5 into a column vector and connects the column vectors to generate a matrix P. Next, the noise reduction unit 205 performs a noise reduction processing on the matrix P, and generates a matrix Pd obtained by connecting the six patches x0' to x5' with the noise having been reduced.

Furthermore, the noise reduction unit 205 performs two-stage processing as the noise reduction processing. As a first step of processing, the noise reduction unit 205 performs, for each of the patches of interest, the calculation processing of formulas (2) to (5) to generate a patch group with noise having been reduced, and performs a patch integration process described below to generate a first image with noise having been reduced. Then, as a second step of processing, the noise reduction unit 205 performs similar processing by using, as an input image, the first noise-reduced image generated in the first step of processing to generate a second noise-reduced image.

A premise for the above-described noise reduction processing is that a matrix obtained by subtracting v from diagonal components of a covariance matrix is a good approximation of a covariance matrix C0 obtained by performing a similar calculation on a patch group with noise having been removed, as represented by the following approximation formula (6).

$$C0 \approx C - vI \quad \ldots (6)$$

In formula (6), I represents an identity matrix. The approximation accuracy of formula (6) improves as the number of patches N increases. More specifically, the difference between each element on the right side of formula (6) and C0 is inversely proportional to the square root of N+1, according to the law of large numbers. Thus, increasing N results in increasing the accuracy of formula (5), and as a result, leads to an improvement in noise reduction performance.

Next, in step S506, the setting unit 201 determines whether an unprocessed patch of interest to be processed next exists. If, in step S506, it is determined that an unprocessed patch of interest exists (YES in step S506), the processing in the information processing apparatus 100 returns to step S501, and the above-described noise reduction processing of steps S501 to S505 is performed. At this time, it is possible to adopt, for example, a technique in which once a patch is selected as a similar patch, the patch is never selected as a patch of interest thereafter, in order to reduce processing time. On the other hand, if, in step S506, it is determined that an unprocessed patch of interest does not exist (NO in step S506), the information processing apparatus 100 terminates the noise reduction processing of steps S501 to S505 and the processing proceeds to step S507.

Then, in step S507, the integration unit 206 generates a noise-reduced image by using the noise-reduced patch group generated in the above-described steps S501 to S505. In this case, the noise-reduced patch groups may overlap with each other. Accordingly, the integration unit 206 needs to determine, for each pixel, a single value obtained by integrating pixel values from a plurality of patches. The integration unit 206 determines a single value by integrating average values of pixel values, but a method for the determining the single value is not limited thereto.

FIG. 7 is a table illustrating four cases of noise reduction performance. The four cases include a case in which no synthesis patch is used, a case in which synthesis noise is not added, a case in which a variance value of synthesis noise v' is equal to a variance value of noise included in the input image v, and a case in which v' is the double of v. In FIG. 7, condition 1 corresponds to the example in which no synthesis patch is used, condition 2 corresponds to the case in which no synthesis noise is added, condition 3 corresponds to the case in which the variance value of synthesis noise v' is equal to the variance value v of noise included in the input image, and condition 4 corresponds to the case in which v' is the double of v.

In the present exemplary embodiment, the patch is a square having a width of 12 pixels and a height of 12 pixels, and the number of similar patches N1 is 216. The values illustrated in FIG. 7 are peak signal-to-noise ratios (PSNR) of a patch of interest with noise having been reduced. PSNR is one of image quality indices, and a higher value of PSNR means that the result of noise reduction is closer to a true value. As can be seen from FIG. 7, the noise reduction processing using synthesis patches in the information processing apparatus 100 according to the present exemplary embodiment, under all of the conditions 1 to 4, achieves high and substantially similar values of PSNR. In other words, it can be understood that the processing according to the present exemplary embodiment is capable of stably providing high quality images with reduced noise irrespective of image content.

The above-described first exemplary embodiment is an example in which a weighted average of base patches is generated as the intermediate patch in the synthesis patch generation processing. In a second exemplary embodiment, an example in which an intermediate patch is generated by using basis decomposition will be described. A basic apparatus configuration and a processing flow in the information processing apparatus 100 according to the second exemplary embodiment are alike those in the first exemplary embodiment, and thus redundant illustration and description thereof are omitted. In the second exemplary embodiment, processing in the generation unit 204 will be mainly described.

Figure 8:
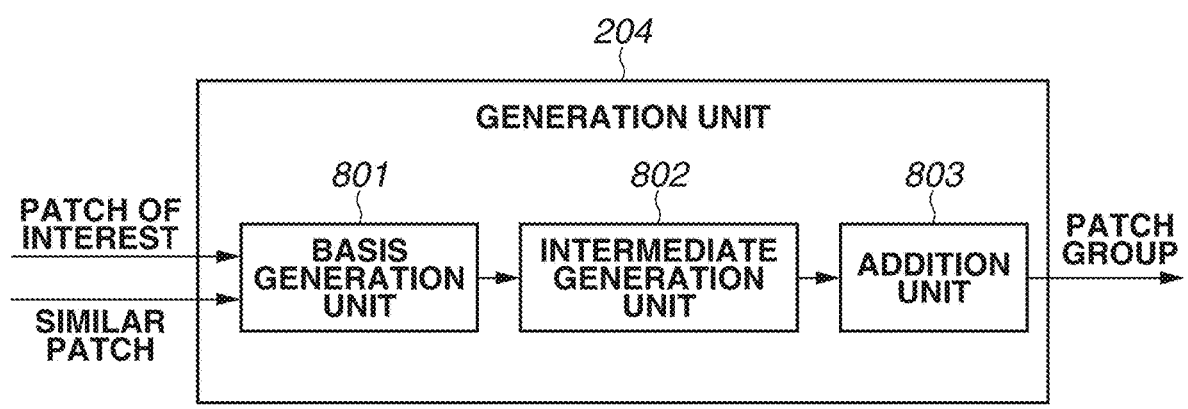
FIG. 8 is a functional block diagram illustrating a functional configuration of a generation unit according to a second exemplary embodiment.

FIG. 8 is a functional block diagram illustrating a functional configuration of the generation unit 204 in the second exemplary embodiment. The generation unit 204 according to the second exemplary embodiment includes a basis generation unit 801, an intermediate generation unit 802, and an addition unit 803.

In the second exemplary embodiment, in step S504 in FIG. 5, the generation unit 204 newly generates, by using a patch of interest and N1 similar patches, N–N1 synthesis patches, and outputs a patch group. In the generation unit 204 according to the second exemplary embodiment, the basis generation unit 801 generates a plurality of basis patches using the patch of interest and similar patches. The basis patch has the same size and the same shape as the patch of interest and the similar patches, and is generated using a known technique. Examples of the known technique include principal component analysis, but are not limited thereto.

Alternatively, the generation unit 204 may use a method in which approximation of the patch of interest is performed by using a basis patch group that is prepared in advance, and only the basis patches used in the approximation is used in the next intermediate patch generation. For example, as processing of the approximation, the generation unit 204 determines a pair of a basis patch and weight so that the distance index, which is similarity between the patch of interest and an approximation patch acquired by selecting a plurality of basis patches and calculating a weighted average of the plurality of basis patches, is minimized. Various optimization methods such as least squares method can be used as a method of determining a pair of a basis patch and a weight that gives the minimum value of the distance index. The basis patch group prepared in advance may be a basis patch group learned from a large number of learning images in advance, or may be provided by a function. Examples of the function include Discrete Cosine Transform Basis and Radial Basis Function.

Next, the intermediate generation unit 802 generates an intermediate patch using all or some of the basis patches. More specifically, the intermediate generation unit 802 generates an intermediate patch by, for example, multiplying each of the basis patches by a randomly determined weight to calculate a weighted average. This weight is desirably in an appropriate range for satisfying the requirement of similarity between the generated intermediate patch and the patch of interest. The patch generated in this way is different from both of the patch of interest and the similar patches, and has a similar texture.

Next, the addition unit 803 generates a synthesis patch by adding synthesis noise to the intermediate patch by performing processing similar to the processing performed by the addition unit 403 in the first exemplary embodiment.

The information processing apparatus 100 according to the second exemplary embodiment performs noise reduction processing by using a patch group to which a synthesis patch generated using the above-described method is added, so that it is possible to improve noise reduction performance compared to a case in which no synthesis patch is used.

In the above-described exemplary embodiments, examples of noise reduction of an input image captured by an image capturing apparatus such as a digital camera are described. However, the input image is not limited to images captured by a digital camera. The input image may be, for example, an image acquired by a personal computer or a tablet terminal having a digital camera function, various information terminals such as a smartphone and a portable game machine, a camcorder, a vehicle-mounted camera, a surveillance camera, a medical camera, or an industrial camera.

The present disclosure may also be embodied by processing in which a program that realizes one or more functions according to the above-described exemplary embodiments is provided to a system or apparatus through a network or a storage medium, and one or more processors in a computer of the system or apparatus read and execute the program. The present disclosure may also be embodied by a circuit (e.g., an application-specific integrated circuit (ASIC)) that realizes one or more functions.

The above-described exemplary embodiments are merely examples of an embodiment for carrying out the present disclosure, and the technical scope of the present disclosure should not be interpreted in a limited manner based on the exemplary embodiments. Thus, the present disclosure can be implemented in various other forms without departing from the technical concept or main features thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-084438, filed Apr. 25, 2019, which is hereby incorporated by reference herein in its entirety.

what is claimed is:

1. An image processing apparatus that performs noise reduction processing by using a patch obtained by dividing an image into small areas, the image processing apparatus comprising:
at least one processor; and
a memory coupled to the at least one processor, the memory having instructions that, when executed by the processor, perform operations as:
a setting unit configured to set, for the image, a patch of interest;
a search unit configured to search the image for a-similar patches based on the patch of interest;
a generation unit configured to generate one or more synthesis patches different from a patch included in the image by adding random noise to more than one of the patch of interest and the similar patches, and by synthesizing the added patches; and
a noise reduction unit configured to reduce noise in the patch of interest by using a patch group including the patch of interest, the similar patches, and the one or more synthesis patches.

2. The image processing apparatus according to claim 1, wherein the search unit is configured to set a plurality of reference patches based on a position of the patch of interest, and select the similar patches from the reference patches based on similarity between the patch of interest and the reference patch.

3. The image processing apparatus according to claim 2, wherein the search unit is configured to select, as the similar patches, all reference patches having the similarity exceeding a set threshold.

4. The image processing apparatus according to claim 3, wherein, the search unit is configured to, if the number of the selected similar patches is greater than a predetermined number of patches, sort the selected similar patches according to the similarity, and reselect, as the similar patches, only the predetermined number of patches from the uppermost patch.

5. The image processing apparatus according to claim 1, further comprising a determination unit configured to determine whether to generate the synthesis patch.

6. The image processing apparatus according to claim 5, wherein the determination unit is configured to, if the number of the similar patches searched for is smaller than the predetermined number of patches, determine to generate the synthesis patch.

7. The image processing apparatus according to claim 6, wherein the generation unit is configured to, if a first number that is the number of the similar patches searched for is smaller than a second number that is the predetermined number of patches, generate a synthesis patch or patches, the number of the synthesis patches being equal to a value obtained by subtracting the first number from the second number.

8. The image processing apparatus according to claim 1, wherein the generation unit is configured to generate an intermediate patch based on a subset of similar patches selected from a plurality of similar patches searched for, and generate the synthesis patch based on the intermediate patch.

9. The image processing apparatus according to claim 8, wherein the generation unit is configured to randomly select a plurality of patches from a patch group including the patch of interest and the similar patches to generate the intermediate patch.

10. The image processing apparatus according to claim 9, wherein the generation unit is configured to calculate a weighted average of the plurality of selected patches to generate the intermediate patch.

11. The image processing apparatus according to claim 1, wherein the generation unit is configured to generate a plurality of basis patches based on the patch of interest and the similar patches, generate an intermediate patch based on some or all of the plurality of generated basis patches, and generate the synthesis patch based on the intermediate patch.

12. The image processing apparatus according to claim 1, wherein the generation unit is configured to approximate the patch of interest by using a basis patch group prepared in advance, generate an intermediate patch based on a plurality of basis patches used in the approximation, and generate the synthesis patch based on the intermediate patch.

13. The image processing apparatus according to claim 11, wherein the generation unit is configured to calculate a weighted average of the plurality of basis patches to generate the intermediate patch.

14. The image processing apparatus according to claim 1, wherein the variance value of the random noise is greater than a variance value of noise included in each of pixels in the patch of interest.

15. The image processing apparatus according to claim 14, wherein the variance value of the random noise is determined based on International Organization for Standardization (ISO) sensitivity at a time of capture and acquisition of the image.

16. The image processing apparatus according to claim 1, wherein the noise reduction unit is configured to acquire a probability model based on the patch of interest and the similar patches, and perform noise reduction processing on all of the pixels in the patch of interest based on the probability model.

17. The image processing apparatus according to claim 16, wherein the probability model is represented by a covariance matrix representing correlation between pixels in the patch of interest.

18. An image processing method for performing noise reduction processing by using a patch obtained by dividing an image into small areas, the method comprising:
   setting, for the image, a patch of interest;
   searching the image for similar patches based on the patch of interest;
   generating one or more synthesis patches different from a patch included in the image by adding random noise to more than one of the patch of interest and the similar patches, and by synthesizing the added patches; and
   reducing noise in the patch of interest by using a patch group including the patch of interest, the similar patches, and the one or more synthesis patches.

19. A non-transitory computer-readable storage medium storing instructions that, when executed by a computer, cause the computer to perform a method for performing noise reduction processing by using a patch obtained by dividing an image into small areas, the method comprising:
   setting, for the image, a patch of interest;
   searching the image for a-similar patches based on the patch of interest;
   generating one or more synthesis patches different from a patch included in the image by adding random noise to more than one of the patch of interest and the similar patches, and by synthesizing the added patches; and
   reducing noise in the patch of interest by using a patch group including the patch of interest, the similar patches, and the one or more synthesis patches.

* * * * *